United States Patent [19]

Kratt et al.

[11] Patent Number: 5,385,128
[45] Date of Patent: Jan. 31, 1995

[54] METHOD AND DEVICE FOR LIMITING VEHICLE SPEED

[75] Inventors: Alfred Kratt; Claus-Dieter Nusser, both of Schwieberdingen, Germany

[73] Assignee: Robert Bosch GmbH, Stuttgart, Germany

[21] Appl. No.: 147,173

[22] Filed: Nov. 2, 1993

[30] Foreign Application Priority Data

Nov. 28, 1992 [DE] Germany .............................. 4240117

[51] Int. Cl.⁶ .............................................. F02P 9/00
[52] U.S. Cl. ...................................... 123/335; 123/333
[58] Field of Search ............... 123/335, 333, 334, 330, 123/331, 332; 364/426.03

[56] References Cited

U.S. PATENT DOCUMENTS

| | | | |
|---|---|---|---|
| 4,573,440 | 3/1986 | Pischke et al. | 123/333 |
| 4,853,720 | 8/1989 | Onari et al. | 364/431.07 |
| 5,009,208 | 4/1991 | Florenza, II | 123/334 |
| 5,138,996 | 8/1992 | Florenza, II | 123/335 |
| 5,282,137 | 1/1994 | Suzuki et al. | 364/426.03 |

FOREIGN PATENT DOCUMENTS

| | | |
|---|---|---|
| 0260372 | 3/1988 | European Pat. Off. . |
| 0299235 | 1/1989 | European Pat. Off. . |
| 3715423 | 11/1987 | Germany . |
| 3618844 | 12/1987 | Germany . |
| 4219362 | 12/1992 | Germany . |

Primary Examiner—Raymond A. Nelli
Attorney, Agent, or Firm—Kenyon & Kenyon

[57] ABSTRACT

In a method and apparatus for limiting the speed of motor vehicles, in cases where a speed signal is not available, engine cut-off is not rigidly activated upon exceeding a constant rotational speed threshold. Rather, a variable rotational speed threshold is determined which takes into account instantaneous or previous driving states, thereby being responsive to instantaneous or previous reactions of the vehicle's driver. This provides for an intelligent engine cut-off which accounts for operating conditions and, thus, can substantially better respond during critical driving situations.

10 Claims, 7 Drawing Sheets

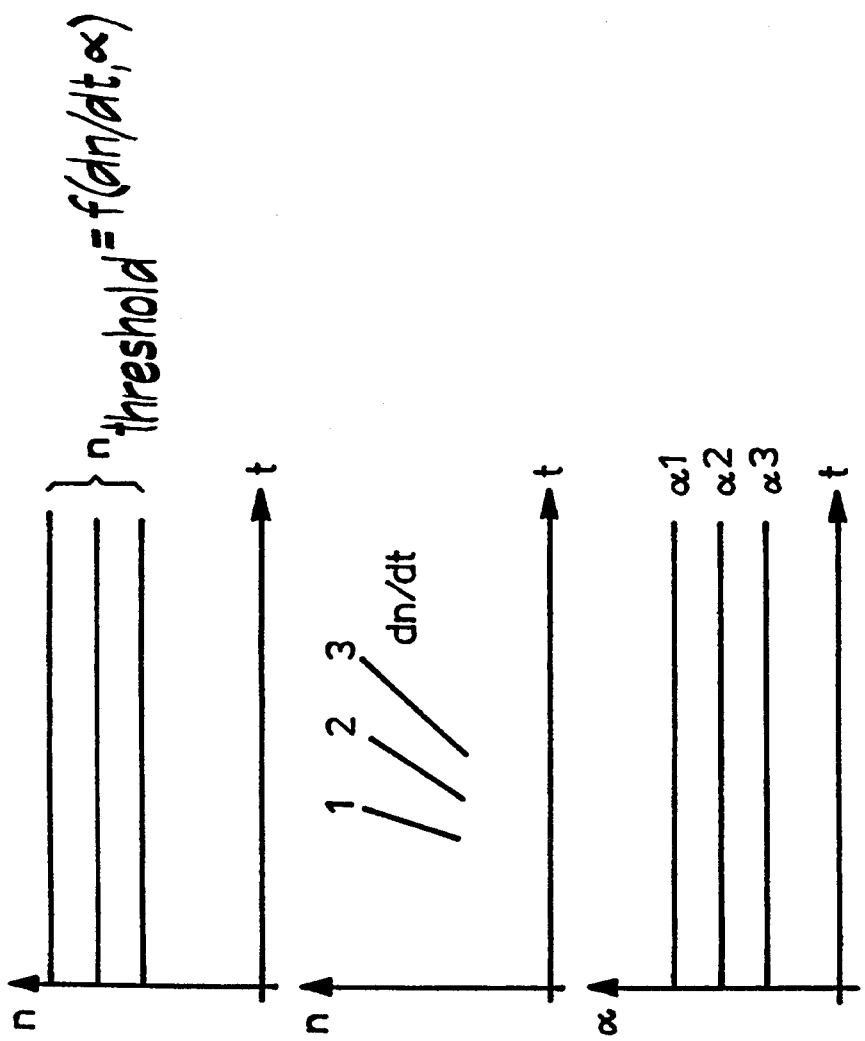

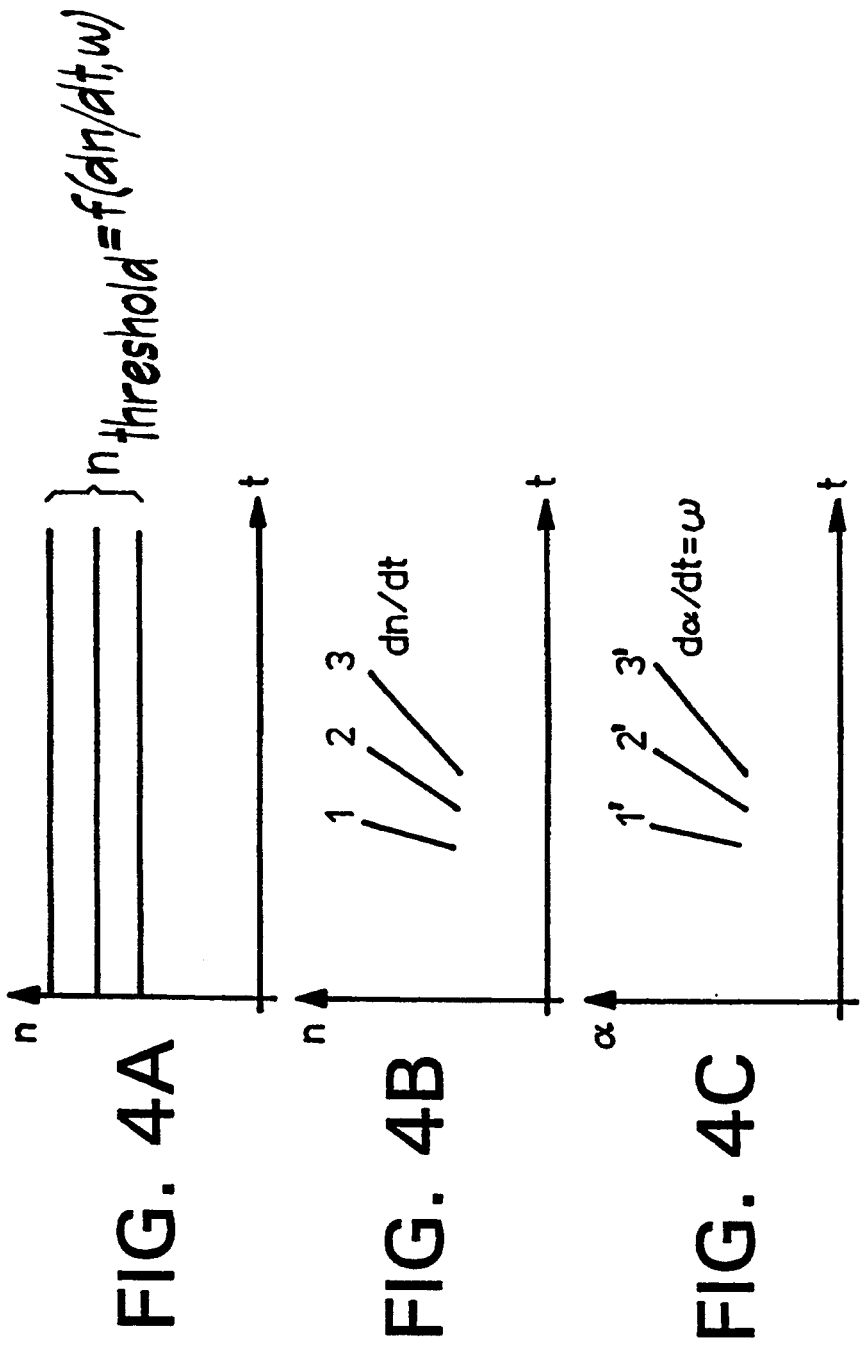

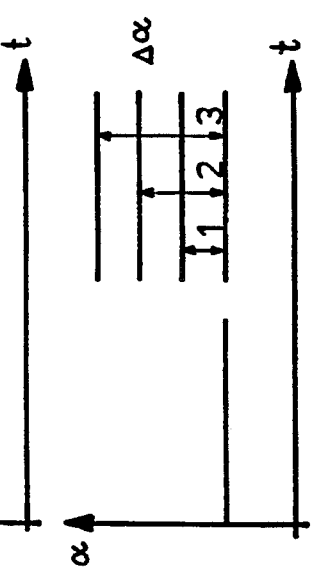
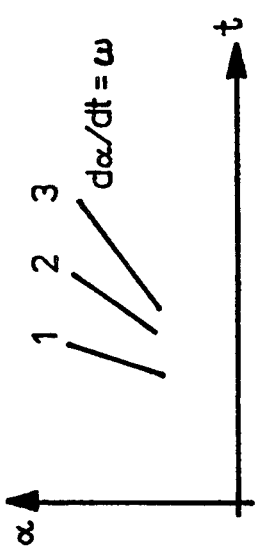
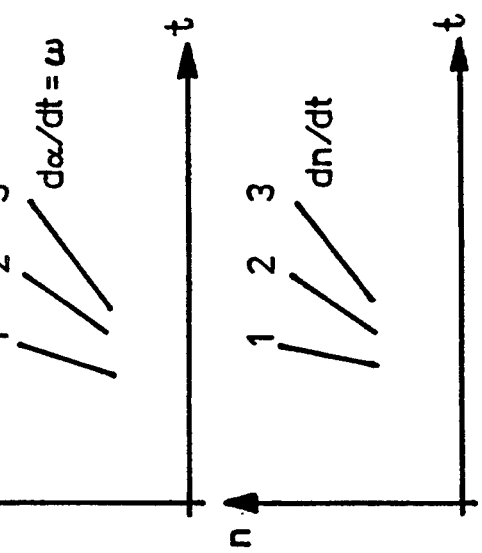
FIG. 6A
FIG. 6B
FIG. 6C
FIG. 6D

METHOD AND DEVICE FOR LIMITING VEHICLE SPEED

TECHNICAL FIELD

The present invention relates to methods and devices for limiting the speed of a motor vehicle. More specifically, it relates to a method and device for limiting the rotational speed of an internal combustion engine based on several operating parameters.

BACKGROUND OF THE INVENTION

Speed limiting devices for motor vehicles are known. European Patent No. EP 260 372 describes a device for activating a speed limitation for motor vehicles in case of a failed or nonexistent vehicle speed signal using a signal corresponding to the engine speed as a basis for limiting the vehicle speed. In other words, by limiting the rotational speed (or r.p.m.) of the engine, typically by either cutting-off or reducing fuel supplied to the engine or by interrupting ignition, a speed limitation is achieved preventing the maximum allowable speed from being exceeded in the highest gear (high gearing ratio). This approach, however, does not rule out the problem of dangerous driving situations occurring when there is a failed speed signal, for example, when acceleration operations are completed in a low gear.

For instance, during a passing maneuver, where the goal is to complete the maneuver within a short driving distance, it is an expected reaction for the driver to shift to a low gear should oncoming traffic appear. In the lower gears, the driver can utilize the engine's full power to quickly complete the passing maneuver. However, even when the maximum r.p.m. is only briefly exceeded, a condition which can easily be withstood by present-day engines, an especially dangerous situation could arise if the fuel supply or ignition were to be cut off at that point.

Therefore, in cases where a signal indicative of the motor vehicle's speed is not available, it is desirable for engine cut-off not to be rigidly activated, as would occur when a constant rotational-speed threshold is exceeded. Rather, it would be beneficial for there to be a flexible speed limitation which would take into account the driving conditions that occur in each case so as to be better able to handle those driving situations where cutting-off the engine could create a safety hazard.

SUMMARY OF THE INVENTION

In accordance with the present invention, given a failed or nonexistent speed signal, a motor vehicle's engine is not rigidly cut-off upon exceeding a constant rotational speed threshold. Rather, a variable rotational speed threshold is determined which takes into account instantaneous or previous driving states, thereby being responsive to instantaneous or previous actions of the vehicle's driver. This provides for an intelligent and flexible engine cut-off which can compensate for operating conditions and, thus, can substantially better respond during critical driving situations such as the dangerous case of a highest gear that has not engaged.

Optimally adapted functions for determining a rotational speed threshold can be determined on the basis of empirical measurements. It is also possible to include in the calculation of the rotational speed threshold, variables that are influenced by the driver's actions. Depending upon which functional dependencies and other operating parameters of the engine are taken as a basis for activating engine cut-off, it is possible to completely dispense with the speed signal given a good adaptation of the functions. This has the advantage that even when driving in the highest gear, there is not always a cut-off when a fixed rotational-speed threshold is exceeded, but rather the actual driving situation is still taken into account. With existing speed-limiting systems which are based on a vehicle speed signal, it is possible that during a passing maneuver in the highest gear, the fuel supply will be cut off or ignition will be interrupted at a critical moment.

In one embodiment of the present invention, once a determination has been made to cut the engine off, i.e., the calculated rotational speed threshold has been exceeded, the engine will be cut off only after a time delay. Such a delay would, for instance, give an automatic transmission to which the engine is coupled an opportunity to shift up, even though the calculated threshold value has been exceeded.

BRIEF DESCRIPTION OF THE DRAWINGS

FIGS. 2 through 6 are timing diagrams showing various functional dependencies which can be used singly or in any desired combination to determine a threshold value for activating a speed limitation.

DETAILED DESCRIPTION

Figure 1:
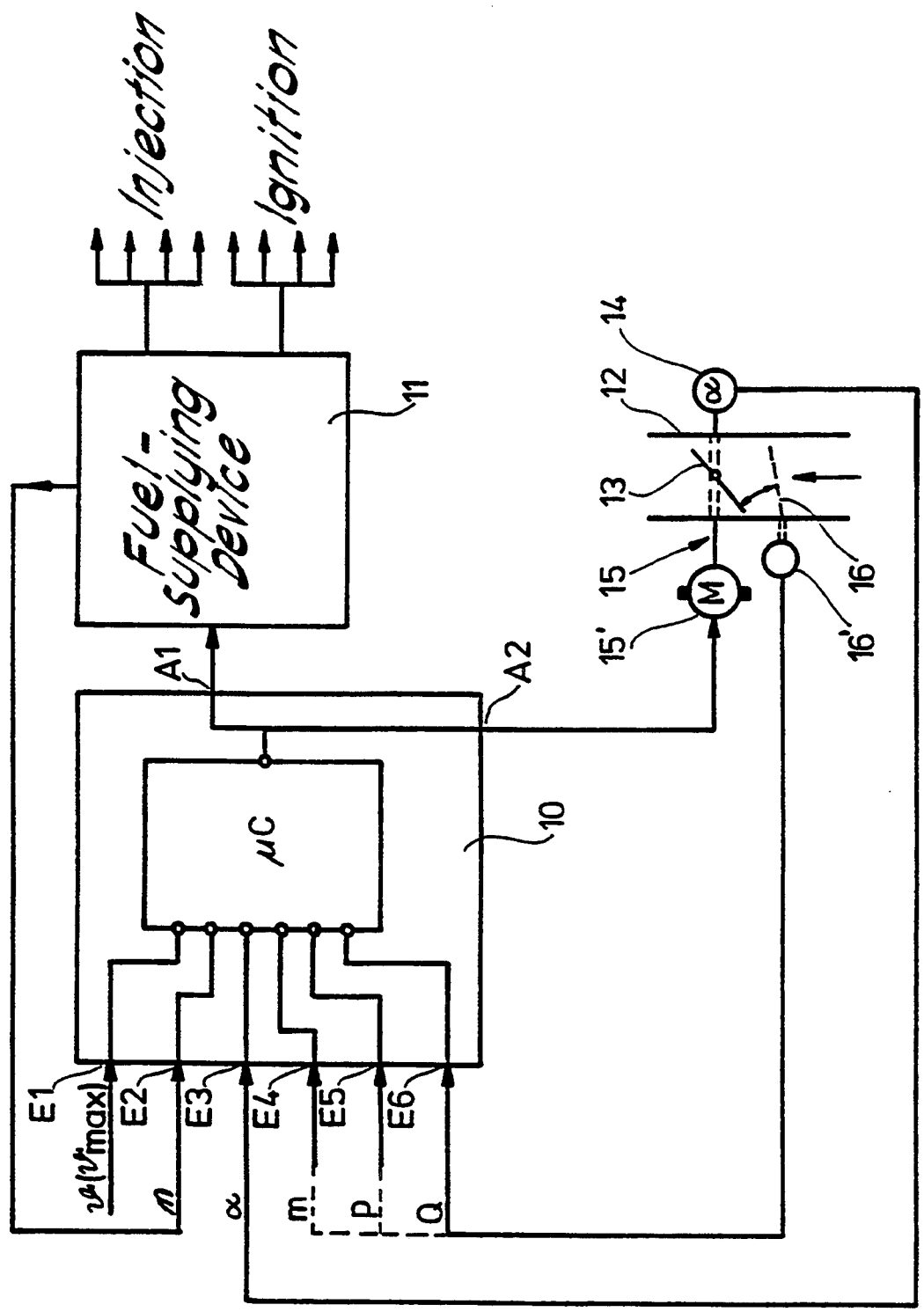
FIG. 1 is a schematic representation of an embodiment of a device for cutting off fuel to an engine when a rotational-speed threshold is reached.

FIG. 1 shows a processor 10, preferably a microprocessor or comprising a microprocessor, for calculating a rotational speed threshold (NMAXDV) from supplied operating parameters. In the embodiment shown, the processor 10 has six input terminals, E1–E6, and two outputs A1 and A2 for controlling the operational performance of an internal combustion engine having a fuel-supplying device 11. Also depicted schematically is an intake manifold area 12 with a throttle valve 13 and a throttle-valve angular-position transducer 14 and, optionally, an E-gas installation 15 with an actuating motor 15' for controlling the position of the throttle-valve 13.

A speed signal v, a rotational speed (r.p.m.) signal n, a signal representing the throttle-valve angle $\alpha$, and signals representing the air-mass flow m, pressure p, and air-quantity flow Q, in the air intake manifold 12 are supplied to the inputs E1–E6. Any one or more of the three last mentioned parameters m, p, and Q, need be used. These parameters can be measured by sensors arranged in the intake manifold 12 of the internal combustion engine. These sensors are represented in FIG. 1 by a schematically depicted air-flow sensor plate 16 having a position sensor 16'.

In determining a rotational speed threshold NMAXDV above which fuel to the engine will be cut-off, the processor 10 performs a calculation including at least one of the following sets of input or intermediate parameters:

a) the instantaneous or the preceding r.p.m. gradient, $dn/dt$;

b) the throttle-valve angle, $\alpha$, as well as the r.p.m. gradient, $dn/dt$;

c) the preceding throttle-valve angular velocity, $\omega$ (or $d\alpha/dt$), i.e., the speed of adjustment of the throttle valve as produced by driver input, as well as the preceding or instantaneous r.p.m. gradient, dn/dt;

d) the preceding throttle-valve change angle $\Delta\alpha$ over a certain time interval, as well as the r.p.m. gradient, dn/dt;

e) the throttle-valve change angle, $\Delta\alpha$, the instantaneous or preceding throttle-valve angular velocity, $\omega$, and the r.p.m. gradient, dn/dt;

f) as an alternative to the throttle-valve angular velocity, $\omega$, and/or to the throttle-valve change angle, $\Delta\alpha$, an air-mass flow rate of change, dm/dt, and/or an air-mass flow change value, $\Delta m$;

g) as an alternative to the throttle-valve angular velocity, $\omega$, and/or to the throttle-valve change angle, $\Delta\alpha$, a rate of pressure change, dp/dt, and/or a change in pressure differential value, $\Delta p$; and h) as an alternative to $\Delta\alpha/dt$ and/or $\Delta\alpha$, an air-quantity rate of change, dQ/dt, and/or an air-quantity change value, $\Delta Q$.

Accordingly, a variable rotational speed threshold, $NMAXDV_{var}$, is to be calculated in accordance with a formula that is a function of one or more of sets of parameters a–h, i.e., $$NMAXDV_{var} = f(a;b;c;d;e;f;g;h).$$

FIGS. 2 through 6 provide a more precise description of the functional relationships between the various input variables and the calculated rotational speed threshold.

Figure 2:
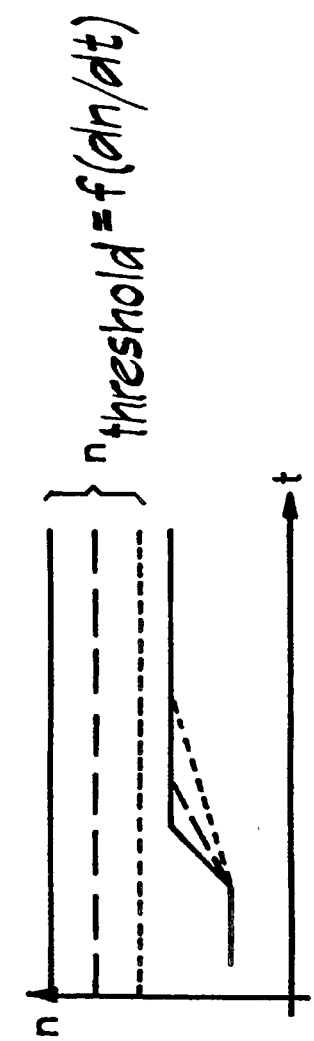

FIG. 2 illustrates the functional dependency of $NMAXDV_{var}$ on the instantaneous or the preceding r.p.m. gradient, dn/dt (i.e., variable set a). The graph of FIG. 2 shows three different rotational speed threshold values, $n_{threshold}$, which are depicted by a solid line, a long-dotted line, and a short-dotted line. Beneath that, three different r.p.m. rates of increase, i.e., r.p.m. gradients dn/dt, are likewise depicted by a solid line, a long-dotted line, and a short-dotted line. FIG. 2 thus illustrates that in the case of a slowly rising rotational speed, the rotational-speed threshold at which fuel to the engine is cut-off will be lower than in the case of a quickly rising rotational speed. It is thus shown how driver input, as it affects rotational speed, influences the determination of $NMAXDV_{var}$.

FIG. 3 illustrates the functional dependency of $NMAXDV_{var}$ on the throttle-valve angle, $\alpha$, and the r.p.m. gradient, dn/dt (i.e., variable set b). In FIG. 3, three different rotational speed threshold values, $n_{threshold}$, are shown as a function of the r.p.m. gradient, dn/dt, and the throttle-valve angle, $\alpha$. The r.p.m. gradient, dn/dt, and the throttle-valve angle, $\alpha$, are included in the threshold-value calculation, in accordance with empirically determined criteria and programs.

FIG. 4 depicts the functional dependency of $NMAXDV_{var}$ on the angular velocity, $\omega$ (or $d\alpha/dt$), and the r.p.m. gradient, dn/dt (i.e., variable set c). Different r.p.m. gradients, numbered 1, 2, and 3 are taken as a basis, in turn, for the rotational-speed-threshold calculation. Various throttle-valve angular velocities, numbered 1', 2', and 3' are also shown, which likewise enter into the calculation.

Figure 5A:
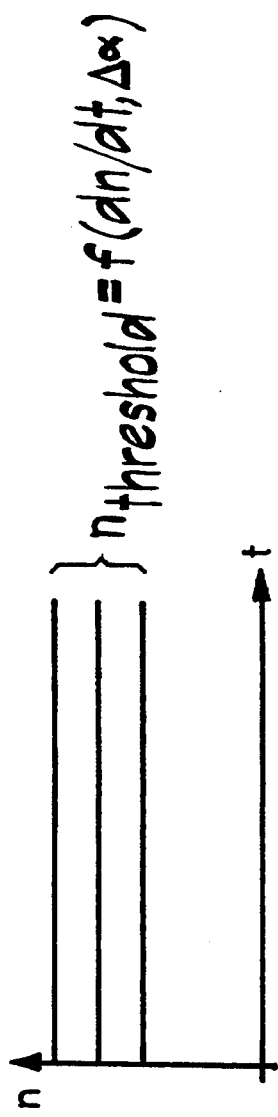
Figure 5B:
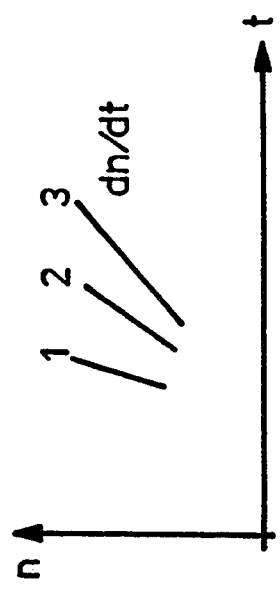
Figure 5C:
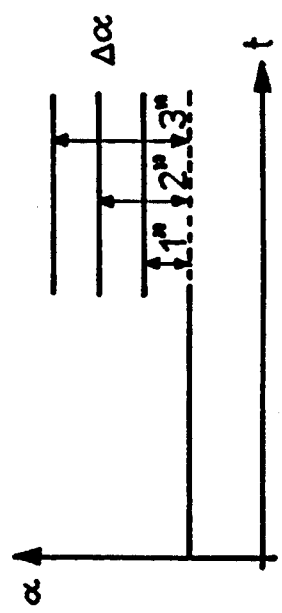

The functional dependency of $NMAXDV_{var}$ on the preceding throttle-valve change angle $\Delta\alpha$ over a certain time interval, and on the r.p.m. gradient, dn/dt (i.e., variable set d), is depicted by the graphs of FIG. 5. Here, the rotational speed threshold is determined by the throttle-valve change angle $\Delta\alpha$, over a given time interval, as well as the r.p.m. gradient dn/dt.

FIG. 6 relates to the functional dependency on the throttle-valve change angle, $\Delta\alpha$, the instantaneous or preceding throttle-valve angular velocity, $\omega$, and the r.p.m. gradient, dn/dt (i.e., variable set e).

It is understood that the representations of FIG. 2–6 are indicated merely by way of example since suitable computers can use any desired intermediate values as a basis and process them.

It is also noted that the different sets of variables, which can be used alone or in combination to calculate the rotational speed threshold, are well suited for acquiring the previous operating states of the motor vehicle.

Finally, as indicated above, the derivative and/or the differential values of the air-mass flow (dm/dt and $\Delta m$, respectively), or of the intake manifold pressure (dp/dt and $\Delta p$), or of the air-quantity (dQ/dt and $\Delta Q$), can be used as input variables as an alternative to the throttle-valve position and its rate of change. The graphical representations of these dependencies are similar to those of FIG. 6.

Figure 7:
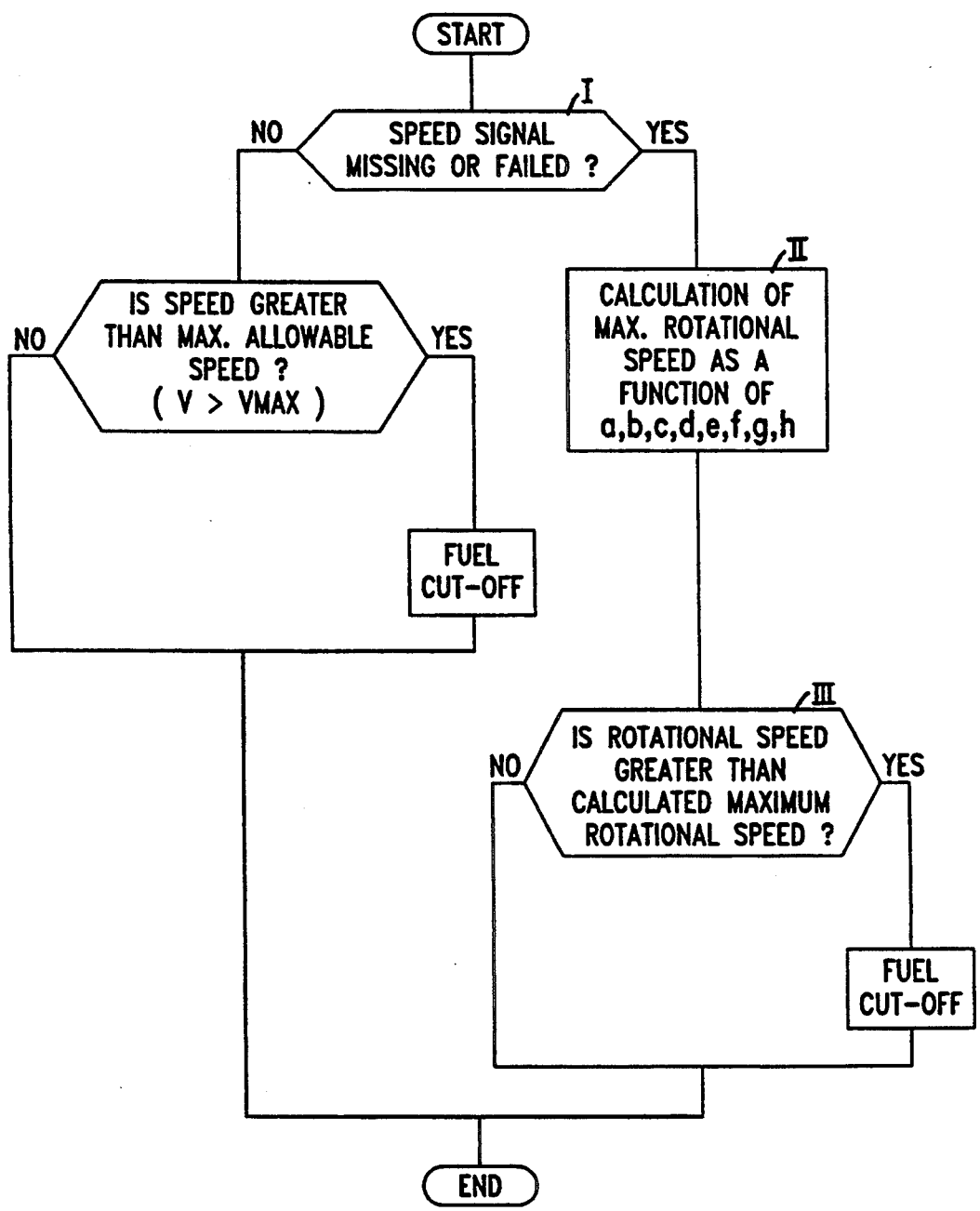
FIG. 7 is a flow chart depicting functional steps in the method of the present invention.

FIG. 7 shows a flow chart which depicts that once a determination has been made, at block I, that the speed signal has failed, a calculation is performed, at functional block II, of the rotational speed threshold as a function of one or more of the sets of variables a–h listed above. After a subsequent comparison, at block III, to determine whether the effective, actual rotational speed is greater than the calculated maximum rotational speed, fuel cut-off is undertaken if indeed it is. As shown by the upper diagrams of FIGS. 2 through 6, the calculated threshold r.p.m. can assume substantially different values, depending upon past and present operating states.

Tests performed during acceleration operations in which the motor vehicle was shifted from first gear to increasingly higher gears while starting in each gear with more or less the same r.p.m. (n), showed that with a given constant throttle-valve angle, the r.p.m. gradient (dn/dt) clearly decreases with each higher gear. Given the same power and air-quantity supply, the rotational speed of an internal combustion engine increases more slowly when the transmission is in a higher gear. Further measurements show, as expected, that the r.p.m. gradients decrease with smaller throttle-valve deflections.

Given the r.p.m. gradients, while taking into consideration the throttle-valve angle profile that was used as a basis, and the current r.p.m., and/or other described operational variables and their changes (derivative and/or differential value), it is thus possible to determine which gear is selected in a transmission to which the engine is coupled. This can be done under certain selected conditions, such as constant load, level driving route, and constant wind, which can initially be taken as a basis, for example, for empirical measurements and for defining parameters and calculation functions. As discussed above, an air-mass flow signal, a pressure signal, or an air-quantity signal can be used, as alternatives to the throttle-valve angle.

It is thus possible, in cases where a vehicle speed signal is not available, to activate an engine cut-off only when the desired, maximum allowable speed $V_{max}$ is exceeded. In other words, the calculated rotational speed threshold would vary depending upon which transmission gear is detected as being engaged.

It is understood that one should select the specific parameters, as well as the calculation method, in accordance with the motor vehicle type, the power of the internal combustion engine, and other parameters, so that on no account will a fuel cut-off be first activated above a specified maximum vehicle speed, $V_{max}$, thus when it is exceeded. Therefore, the method and apparatus of the present invention ensures that engine cut-off will be reliably activated under varied conditions, e.g., where the vehicle is unladen, in the case of inclines, or in case of a tail wind.

What is claimed:

1. A method for limiting the rotational speed of an engine of a motor vehicle, comprising the steps of:
   a) determining a rotational speed threshold as a function of one or more engine operating parameters selected from the group consisting of:
      i) a rotational speed gradient (dn/dt),
      ii) a throttle-valve angle ($\alpha$),
      iii) a throttle-valve angular velocity ($\omega$) (d$\alpha$/dt),
      iv) a throttle-valve change angle ($\Delta\alpha$) over a predetermined time interval,
      v) an air-mass flow rate of change (dm/dt),
      vi) an air-mass flow change value ($\Delta$m),
      vii) a rate of pressure change (dp/dt),
      viii) a pressure change value ($\Delta$p),
      ix) an air-quantity rate of change (dQ/dt), and
      x) an air-quantity change value ($\Delta$Q);
   b) measuring the actual rotational speed of the engine;
   c) comparing the actual rotational speed of the engine to the rotational speed threshold; and
   d) cutting-off the engine if the actual rotational speed of the engine is at least as great as the rotational speed threshold.

2. The method of claim 1, further comprising the step of determining in which transmission gear the motor vehicle is operating and determining a different rotational speed threshold for each transmission gear.

3. The method of claim 1, wherein the engine is cut-off by performing at least one of the following steps: cutting-off fuel to the engine, interrupting the engine's ignition, and changing the throttle-valve opening.

4. The method of claim 1, wherein the engine is cut-off a predetermined time period after it is determined that the actual rotational speed is at least as great as the rotational speed threshold.

5. A device for limiting a rotational speed of an engine of a motor vehicle having a throttle with a throttle valve, the device comprising:
   engine control means for cutting-off the engine in response to an engine cut-off signal; and
   a processor having a plurality of inputs with a plurality of input parameter signals including a rotational speed signal, a throttle valve position signal, an air mass flow signal, an intake manifold pressure signal, and an air quantity signal;
   the processor further including
      means for storing previous input signal values;
      means for computing a rotational speed threshold from the input signals and from the previous input signal values;
      means for comparing the rotational speed input signal against the computed rotational speed threshold; and
      means for generating the engine cut-off signal coupled to the engine control means such that the engine is cut-off when the rotational speed of the engine is at least as great as the rotational speed threshold.

6. The device of claim 5, wherein the processor further includes means for determining in which transmission gear the motor vehicle is operating and determining a different rotational speed threshold for each transmission gear.

7. The device of claim 5, wherein the engine control means includes fuel delivery means which cuts-off fuel supplied to the engine in response to the engine cut-off signal.

8. The device of claim 5, wherein the engine control means includes ignition means which interrupts fuel ignition in the engine in response to the engine cut-off signal.

9. The device of claim 5, wherein the engine control means includes throttle control means which changes the throttle valve opening in response to the engine cut-off signal.

10. The device of claim 5, wherein the processor further includes delay means causing the engine cut-off signal to be generated a predetermined time period after it is determined that the actual rotational speed is at least as great as the rotational speed threshold.

* * * * *